(12) United States Patent
Ho

(10) Patent No.: US 6,293,512 B1
(45) Date of Patent: Sep. 25, 2001

(54) COLLAPSIBLE SUPPORT FRAME

(76) Inventor: Ching-Mo Ho, 8 Lane 337,Hsin Yi St., 16$^{th}$ Lin, Jen Der Village, Wu Zoo Hsiang, Taichung Hsien (TW)

( * ) Notice: Subject to any disclaimer, the term of this patent is extended or adjusted under 35 U.S.C. 154(b) by 0 days.

(21) Appl. No.: 09/561,918

(22) Filed: May 1, 2000

(51) Int. Cl.$^7$ .................................................... F16M 13/00
(52) U.S. Cl. .......................... 248/579; 248/521; 248/525; 248/529; 248/528; 248/150; 248/188.6; 248/407; 248/166; 248/167; 248/169; 248/171
(58) Field of Search .................................... 248/519, 521, 248/525, 529, 151, 150, 528, 188.7, 188.6, 188.91, 407, 432, 166, 167, 169, 171

(56) References Cited

U.S. PATENT DOCUMENTS

| | | | |
|---|---|---|---|
| 2,706,609 | * 4/1955 | Sullivan | 248/166 |
| 3,387,808 | * 6/1968 | Metcalf | 248/46 |
| 4,288,052 | * 9/1981 | Scott | 248/188.6 |
| 5,022,620 | * 6/1991 | Scott | 248/188.6 |
| 5,290,004 | * 3/1994 | Frost et al. | 248/528 |

* cited by examiner

Primary Examiner—Leslie A. Braun
Assistant Examiner—A. Joseph Wujciak
(74) Attorney, Agent, or Firm—Browdy and Neimark

(57) ABSTRACT

A collapsible support frame is formed of an inner tube, an outer tube, and a plurality of support legs. The support legs are fastened to the inner tube and the outer tube. The inner tube is rotatably fitted into the outer tube. The folding and the unfolding of the support legs are attained by turning the inner tube an angle. The inner tube has a hollow interior for holding a Christmas tree, a flag pole, and the like.

1 Claim, 7 Drawing Sheets

PRIOR ART FIG.1

COLLAPSIBLE SUPPORT FRAME

FIELD OF THE INVENTION

The present invention relates generally to a support frame for holding an object, such as Christmas tree, flag pole, sheet music, clothespole, and more particularly to a collapsible support frame.

BACKGROUND OF THE INVENTION

As show in FIGS. 1 and 2, a collapsible support frame of the prior art comprises a cylindrical main body and four support legs. The cylindrical main body is formed of an inner tube 1 and an outer tube 1' into which the inner tube 1 is fitted. The inner tube 1 is provided in the tube wall with a threaded hole 11, and in the outer wall of the top end thereof with a protruded portion 12. The outer tube 1' is provided in the tube wall with a through hole 13 is corresponding in location to the threaded hole 11 of the inner tube 1. The notch 14 is corresponding location and size to the protruded portion 12 of the inner tube 1. The inner tube 1 is fitted into the outer tube 1' such that the protruded portion 12 of the inner tube 1 is stopped by the notch 14 of the outer tube 1' and that the inner tube 1 is held in the outer tube 1' securely by a fastening bolt 15 which is engaged with the threaded hole 11 of the inner tube 1 via the through hole 13 of the outer tube 1'. In assembling the inner tube 1 and the outer tube 1', the threaded hole 11 and the through hole 13 must be aligned. In disassembling the inner tube 1 and the outer tube 1', the fastening bolt 15 must be first unfastened. In addition, the protruded portion 12 and the notch 14 undermine the esthetic effect of the collapsible support frame of the prior art.

SUMMARY OF THE INVENTION

The primary objective of the present invention is to provide a collapsible support frame comprising an inner tube, an outer tube, and a plurality of support legs. The inner tube is fitted into the outer tube. The folding and the unfolding of the support legs are easily carried out by turning the inner tube a predetermined angle.

The features and the advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
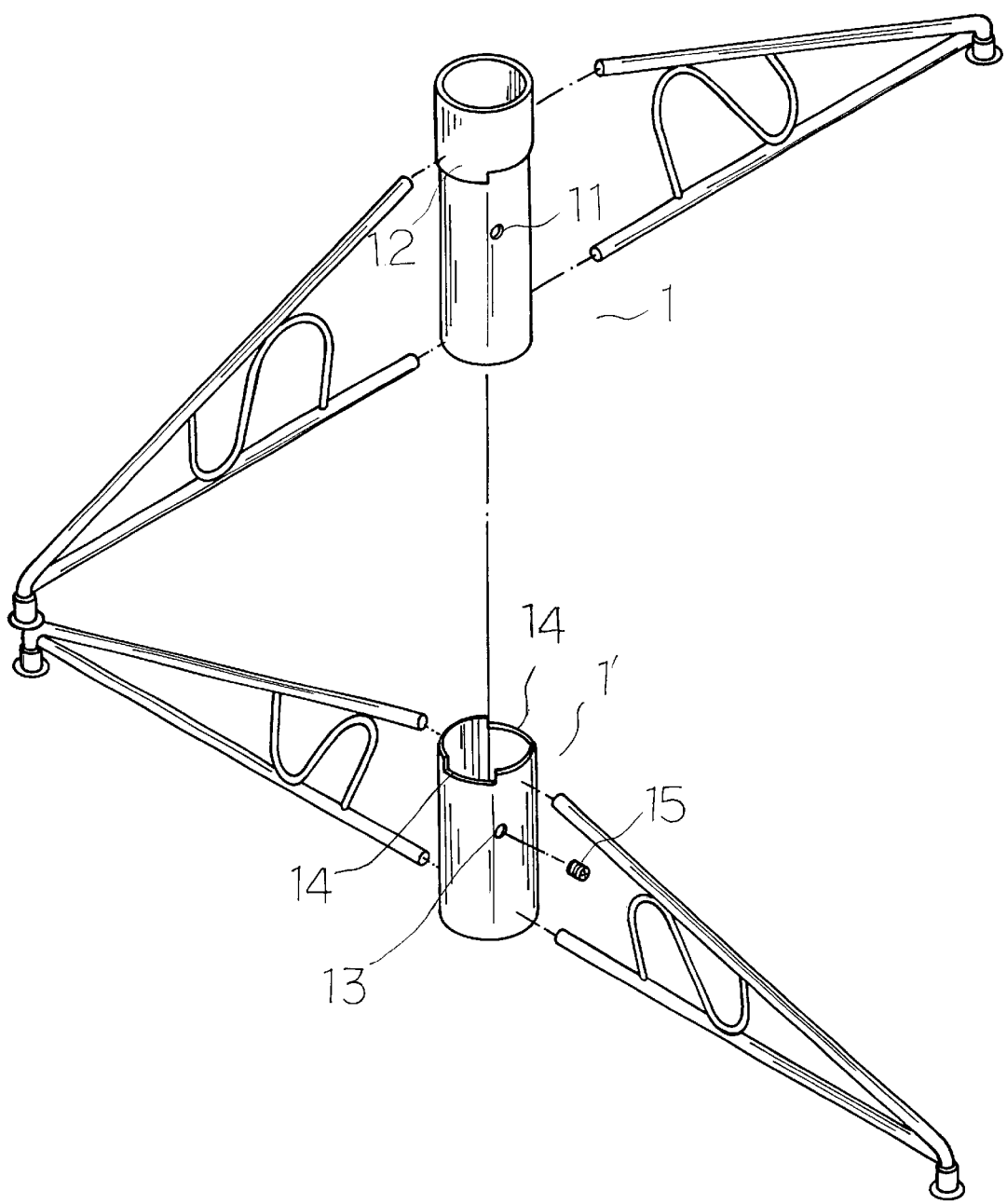
FIG. 1 shows an exploded view of a collapsible support frame of the prior art.
Figure 2:
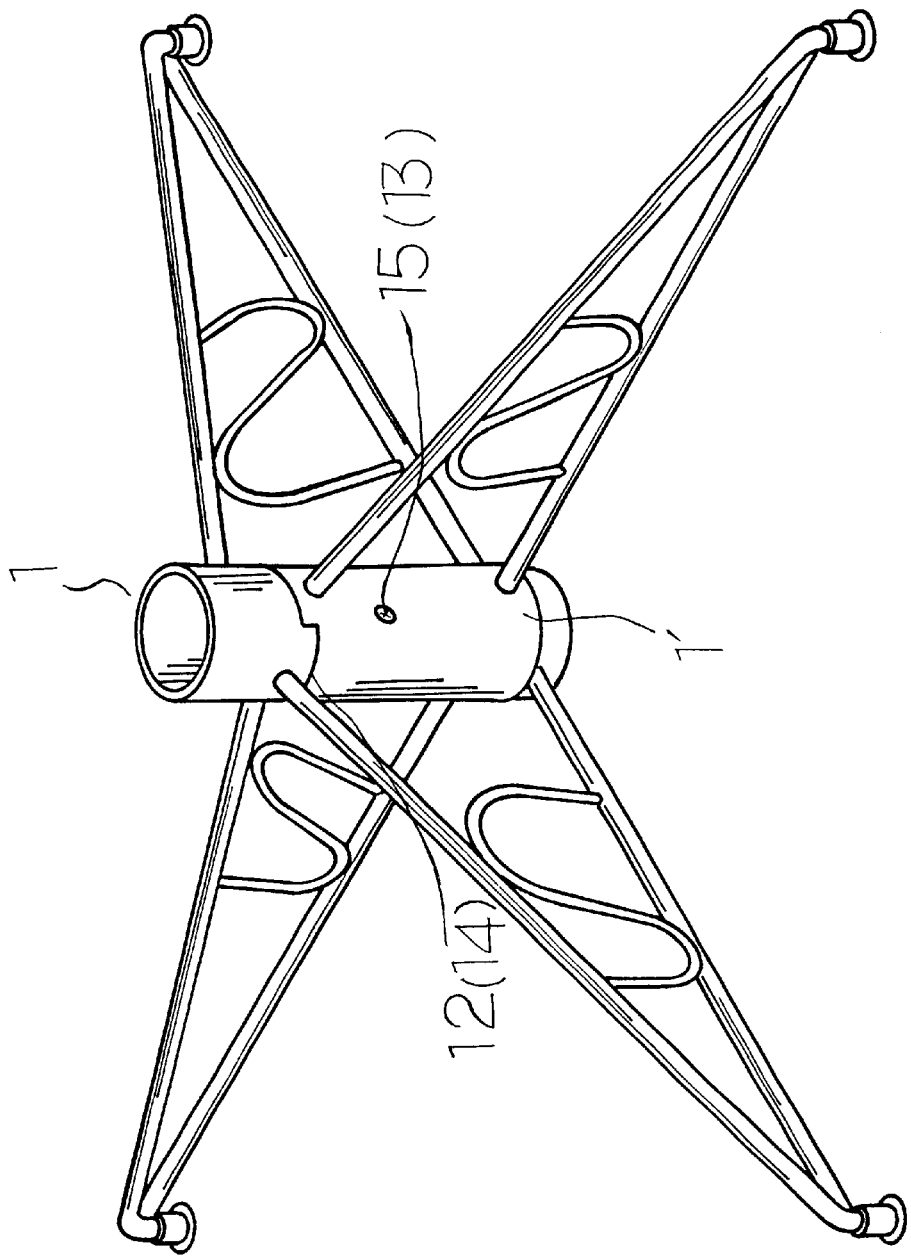
FIG. 2 shows a schematic view of the collapsible support frame of the prior art in combination.
Figure 3:
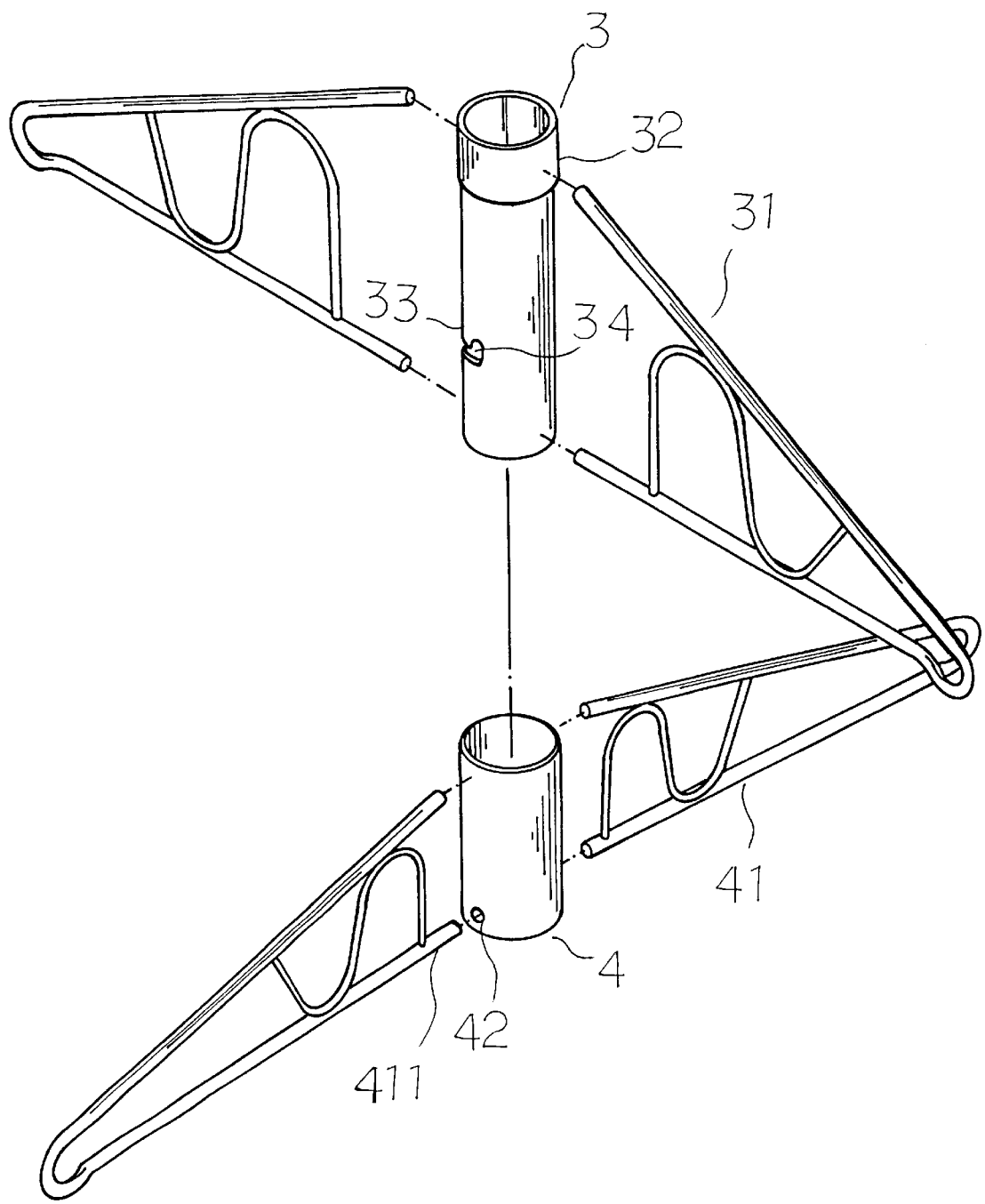
FIG. 3 shows an exploded view of the preferred embodiment of the present invention.

As shown in FIGS. 3–7, a collapsible support frame of the preferred embodiment of the present invention comprises an inner tube 3, an outer tube 4, two first support legs 31 fastened with the inner tube 3, and two second support legs 41 fastened with the outer tube 4.

The inner tube 3 is provided in the outer wall of the top end thereof with a stop portion 32, and in the wall of the lower end thereof with a groove 33, and a retaining slot 34 extending from one end of the groove 33.

Figure 7:
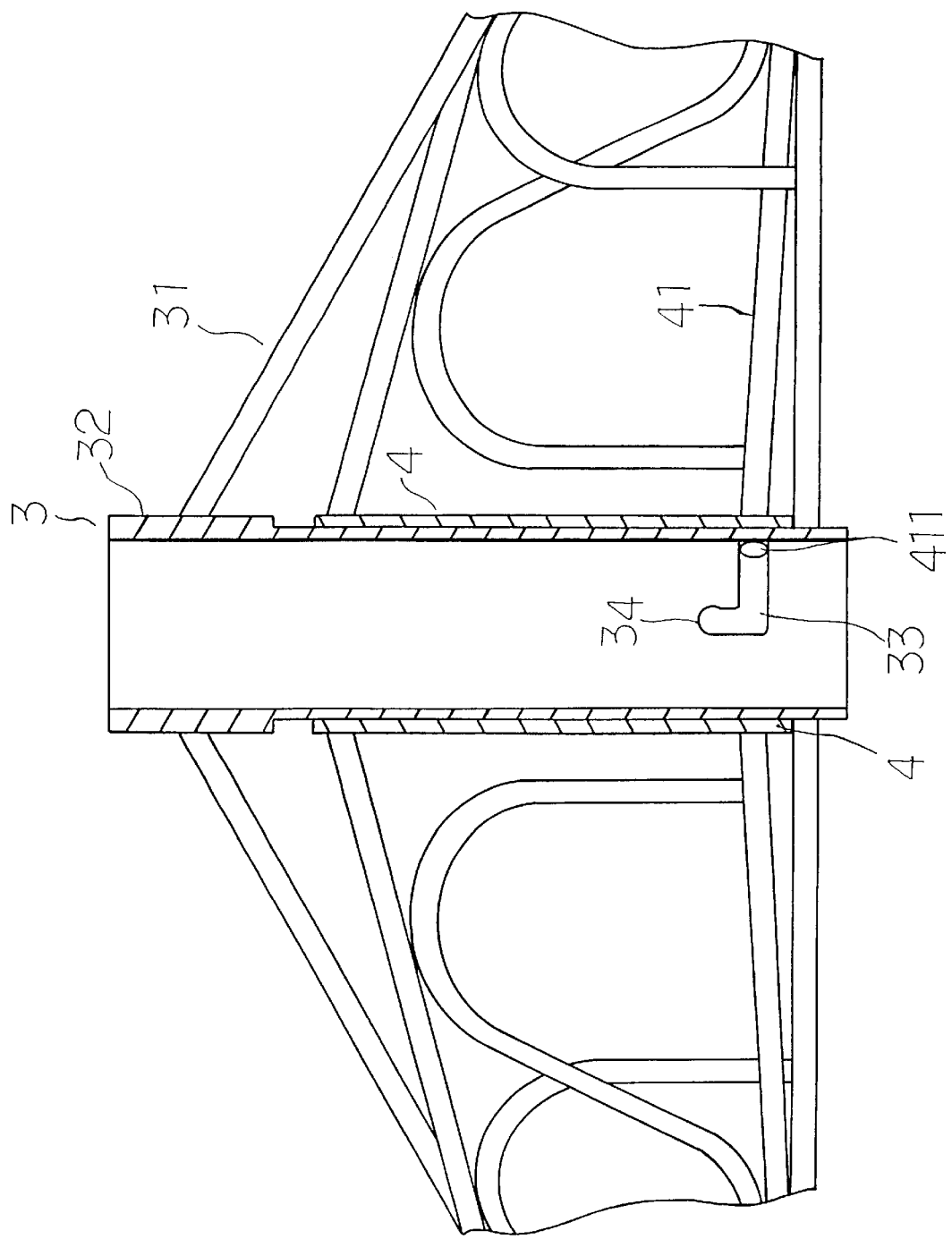
FIG. 7 shows a sectional schematic view of the preferred embodiment of the present invention in the folded state.

The outer tube 4 is provided in the wall of the lower end thereof with a through hole 42 into which a leg rod 411 of the second support leg 41 is inserted such that the end of the leg rod 411 extends to the groove 33, as shown in FIG. 7.

Figure 4:
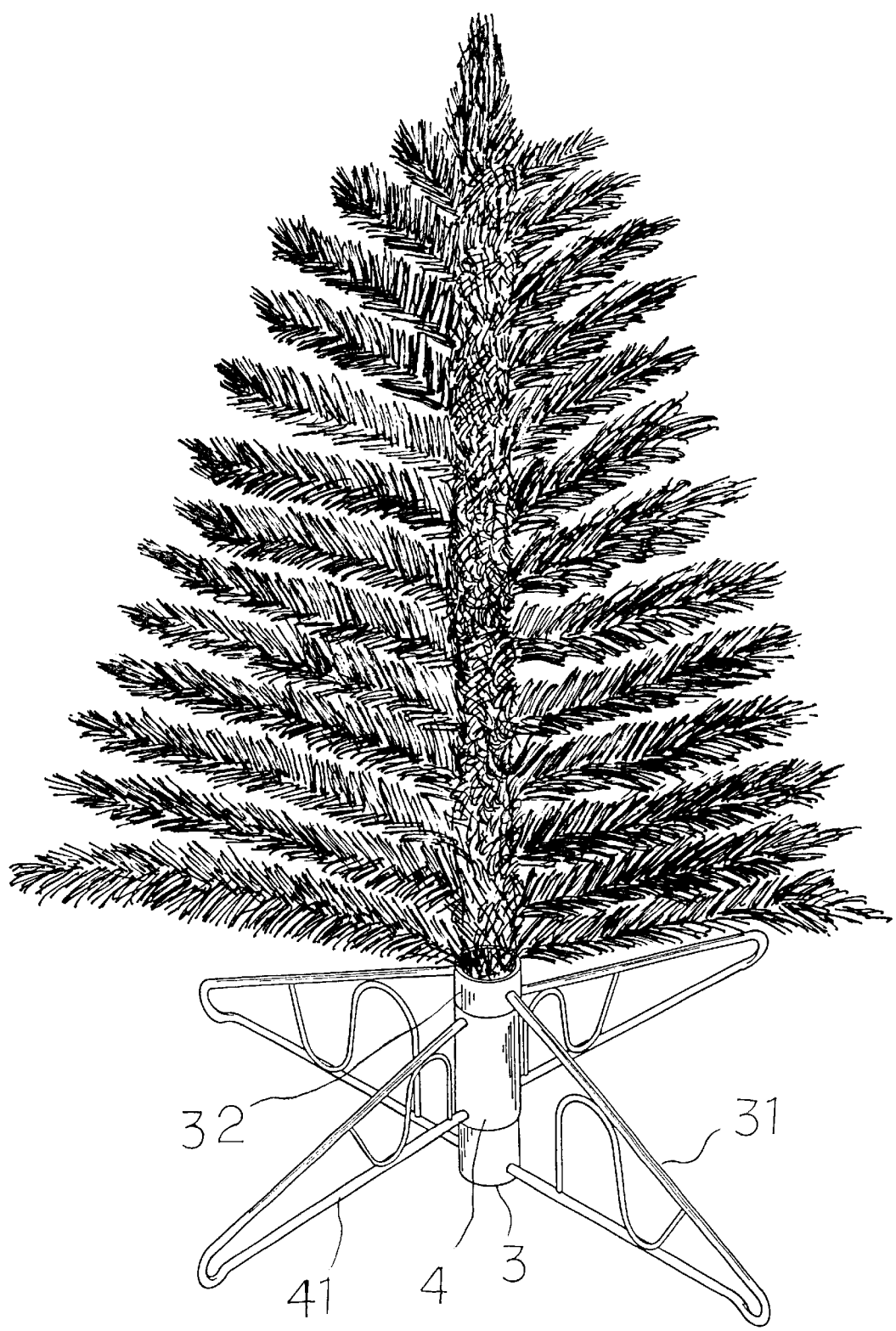
FIG. 4 shows a schematic view of the preferred embodiment of the present invention in use.
Figure 5:
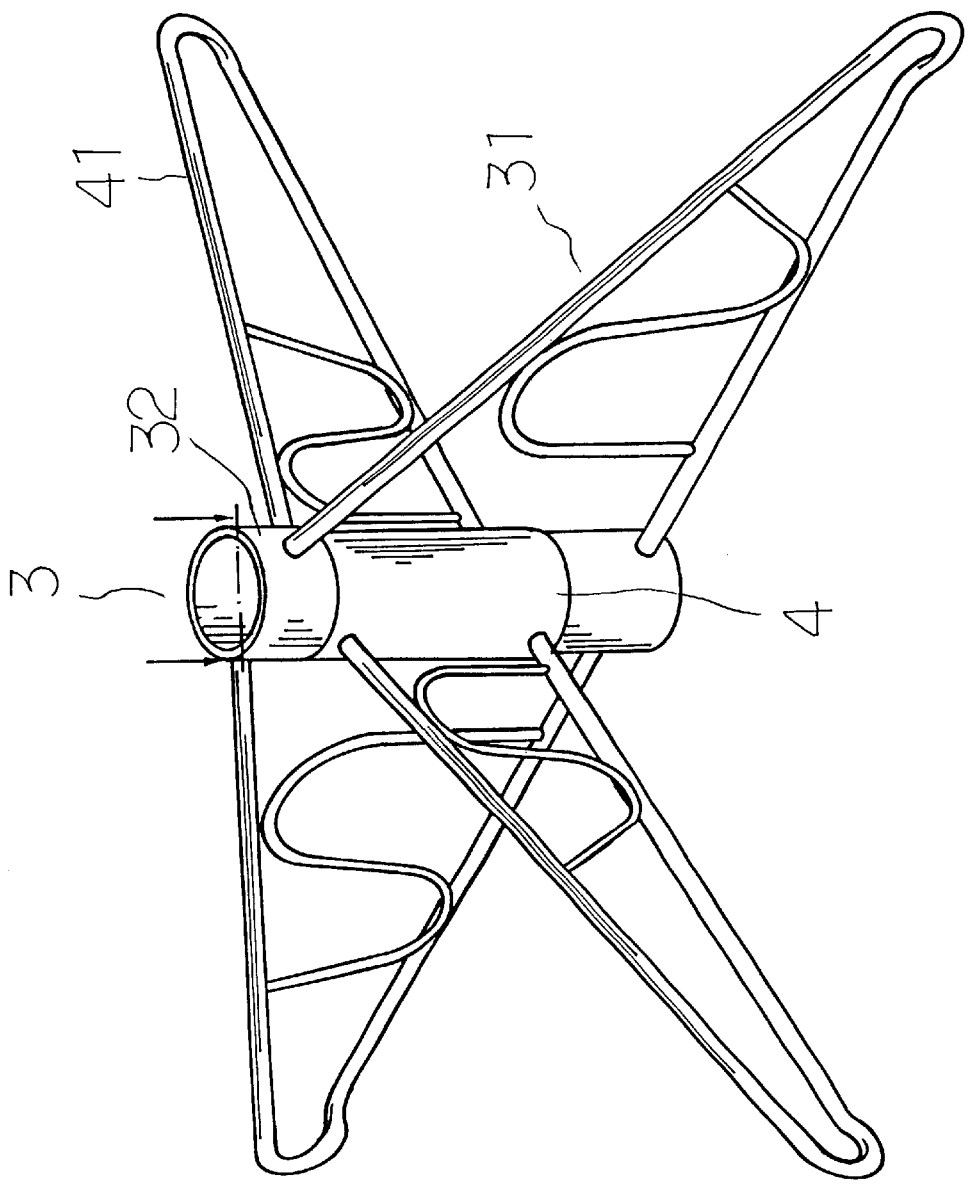
FIG. 5 shows a schematic view of the preferred embodiment of the present invention in combination.
Figure 6:
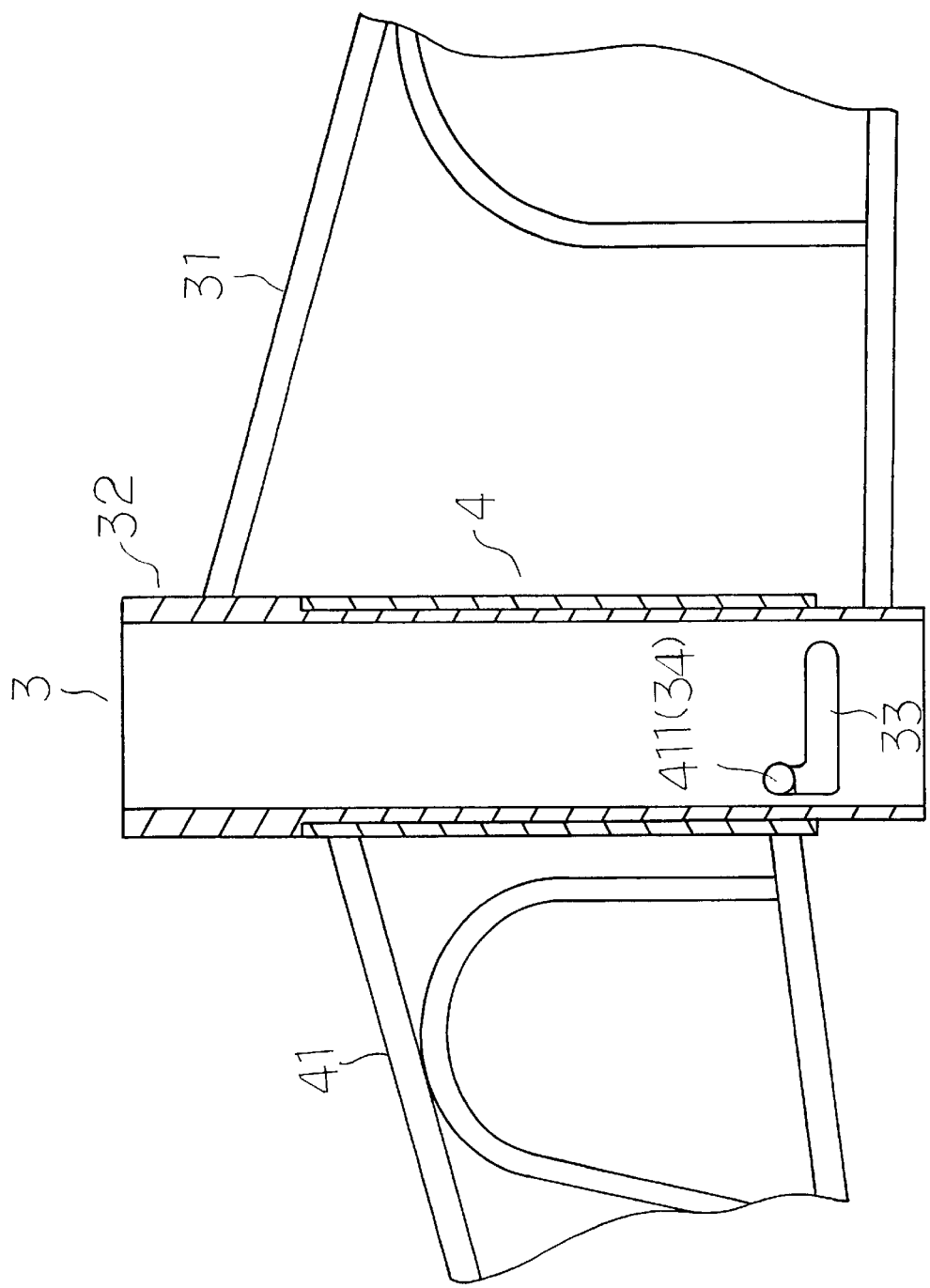
FIG. 6 shows a sectional schematic view of the preferred embodiment of the present invention in combination.

The support legs 31 and 41 can be unfolded by turning the inner tube 3 at an angle and relative to outer tube 4, thereby causing the leg rod 411 to slide to be located in the retaining slot 34. The hollow interior of the inner tube 3 is used to hold an object, such as a Christmas tree, flag pole, sheet must stand, or clothespole, as illustrated in FIG. 4.

The support legs 31 and 41 are folded by lifting slightly the inner tube 3 and then turning the inner tube 3 an angle, thereby causing the leg rod 411 to slide back to other end of the groove 33.

The embodiment of the present invention described above is to be regarded in all respect as being merely illustrative and not restrictive. Accordingly, the present invention may be embodied in other specific forms without deviating from the spirit thereof. The present invention is therefore to be limited only by the scope of the following appended claim.

What is claimed is:

1. A collapsible support frame, comprising:
    an outer tube having a through hole formed in a wall thereof, and in a region of a bottom end of the wall;
    an inner tube rotatably fitted into said outer tube, said inner tube having a stop portion formed at a top end of an outer wall thereof, said inner tube having a groove and a retaining slot extending from one end of the groove, the groove and the retaining slot being provided in a region of a bottom end of said inner tube; and
    a plurality of support legs fastened respectively with said outer tube and said inner tube, one of said support legs having a leg rod that extends through the through hole in said outer tube and into the groove of said inner tube, said support legs being unfolded by turning said inner tube relative to said outer tube such that said leg rod slides to be located in the retaining slot, said support legs being folded by lifting and turning said inner tube relative to said outer tube to cause said leg rod to move from the retaining slot and slide back to another end of said groove.

* * * * *